March 14, 1950        C. A. NITSCH        2,500,904
CONVERTIBLE CONTAINER TOY
Filed March 26, 1947
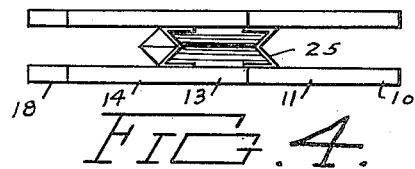
FIG. 4.
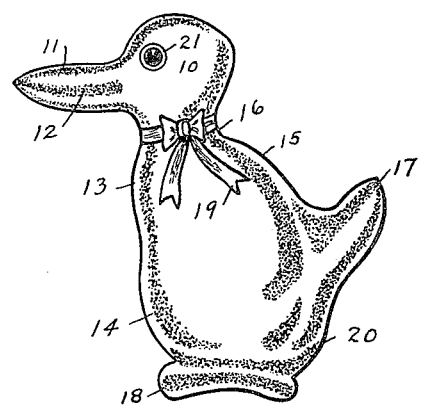 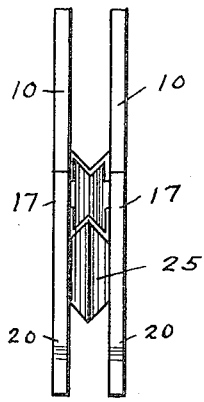
FIG. 2.        FIG. 3.
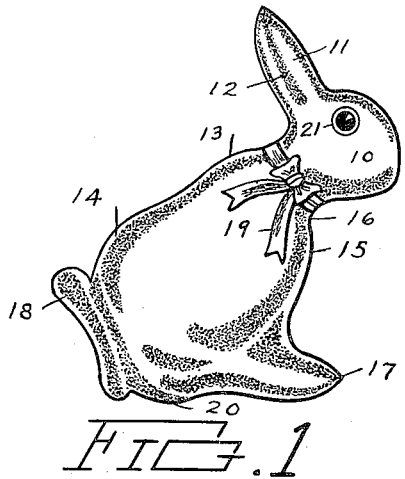 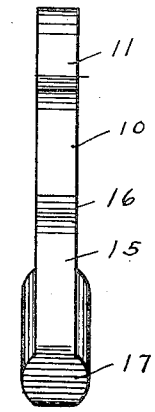
FIG. 1.        FIG. 5.
Inventor
CHARLES A. NITSCH.
By Howard J. Whelan.
Attorney Patented Mar. 14, 1950

2,500,904

UNITED STATES PATENT OFFICE 2,500,904

CONVERTIBLE CONTAINER TOY

Charles A. Nitsch, Elkridge, Md.

Application March 26, 1947, Serial No. 737,206

1 Claim. (Cl. 46—11)

This invention relates to amusement devices and containers for candy or small presents.

It is an object of the present invention to provide a new and improved amusement device that will avoid one or more of the disadvantages and limitations of the prior art.

An additional object of the invention is to provide a new and improved container amusement article that will represent a living being, animal or bird in one position, and another such being, animal or bird when turned to another position, and without changing the structure or physical make-up of the article during such turning.

Other objects will become apparent as the invention is more fully set forth.

For a better understanding of the invention and the objects thereof, reference is made to the appended drawings and the following description, wherein an outline of a particular form of the invention is given by way of example, while the scope thereof is indicated in the claim.

In the drawings:

Figure 1 is a side view of an animal contour embodying this invention, in one of its positions;

Figure 2 is a similar side view of Figure 1, but positioned differently in order to indicate an animal contour of a different nature;

Figure 3 is an end view of Figure 1 showing the internal structure of the device;

Figure 4 is a plan view of Figure 1, and

Figure 5 is an end view of a modified form showing a single animal contour without the pocket.

Similar reference numbers pertain to the same parts throughout the drawings.

In the structure shown in the drawings, and particularly in Figure 1, a pair of plates of flat rigid material are cut to the contour of a ribbit. Its head 10 is shown in a horizontal position with ears 11 extending up semi-vertically and with a line 12 forming the apparent separation between the two of them. Its back line is arcuate and semi-horizontally disposed also. It is shown with the shoulder hump 13 and rump hump 14 in their natural positions. The chest 15 extends down from the neck 16 and culminates in the front feet and paws 17. The tail 18 is disposed in its conventional location as shown. For purposes of ornamentation a ribbon tie 19 is preferably tied about its neck. The back legs 20 are assumed to be curled up underneath. The eye 21 of the animal is shown in the head in its normal position. (And the mouth is designated by a small line adjacent to the part circles.)

When the device is turned as shown in Figure 2 to a position at right angles to that shown in Figure 1, the same parts mentioned in connection with Figure 1 become the parts of a duck. The head is 10. Its mouth is the line 12 in its beak 11. The curved lines 13 and 14 become the breast and belly outline respectively, while the feathered tail is at 17. The feet are shown at 18, the rump at 20 and the eye at 21.

In this instance, the structure of the device consists of two flat pieces of stiff material cut to the contours described, and are symmetrical with each other. They can be separated more or less, by a bendable or foldable pocket element 25, attached in between them. The pocket may be filled with candy or other small articles or presents to suit the user, and resiliently expands and retracts to suit the amount of material held in it. This pocket is so made that it will not spill out its contents in either position that the device may be set in.

When in use, the owner can place it first in the rabbit position with the pawls 17 and 20 forming the base that supports it. Then to change its appearance and effect on the onlookers, he turns in around at right angles to a position where the duck is shown and the impression of the rabbit disappears, although no physical changes have been made in the article. The impression is so unexpected as to be ludicrous and astonishing and always amuses the bystanders that have not been previously informed of the effect. The effect is just as effectual no matter what side of the article the on-lookers are viewing from. Figure 5 shows a modified single animal form, without the pocket, the description and part numbers remain the same.

While but two general forms of the invention are shown in the drawings and described in the specifications it is not desired to limit this application for patent to this particular form or in any other way otherwise than limited by the scope thereof, as it is appreciated that other forms could be made that would use the same principles and come within the scope of the appended claim.

Having thus described the invention what is claimed is:

A convertible toy comprising a pair of plates each of which is contoured to simulate dual body parts, dual head parts and dual base parts, the base parts forming supports on which the toy may be supported in an upright position, the contour of each of said plates being formed to represent the appearance of an animal when said plates rest on one of said supports and to represent the appearance of another animal when resting on the other of said supports, each support constituting the feet of one animal, and means for maintaining said plates in adjustable parallelism, said means comprising a resiliently expandible container having side walls secured to the adjoining internal faces of the plates, said side walls terminating in a bottom wall straddling the dual bases, and flexible end walls connecting said side walls and bottom wall to form an open-ended container, whereby the adjoining internal faces of the plates may be brought in juxtaposition when the container is collapsed and said faces may be adjustably spread apart when said container is filled with candy or small articles, the contents of said container being retained therein by said side walls, bottom wall and end walls when the toy rests on either of said supports.

CHARLES A. NITSCH.

REFERENCES CITED

The following references are of record in the file of this patent:

UNITED STATES PATENTS

| Number | Name | Date |
|---|---|---|
| 152,258 | Thwing | June 23, 1874 |
| 752,584 | Patrick | Feb. 16, 1904 |
| 1,066,769 | Waddington | July 8, 1913 |
| 1,665,043 | Stark | Apr. 3, 1928 |